Nov. 5, 1946.   B. D. BRANNER   2,410,625
LANDING GEAR FOR AIRCRAFT
Filed July 19, 1944   2 Sheets-Sheet 1

INVENTOR.
BERNARD D. BRANNER
BY
*A.W. Deller*
ATTORNEY

Nov. 5, 1946.                B. D. BRANNER                 2,410,625
                       LANDING GEAR FOR AIRCRAFT
                       Filed July 19, 1944        2 Sheets-Sheet 2
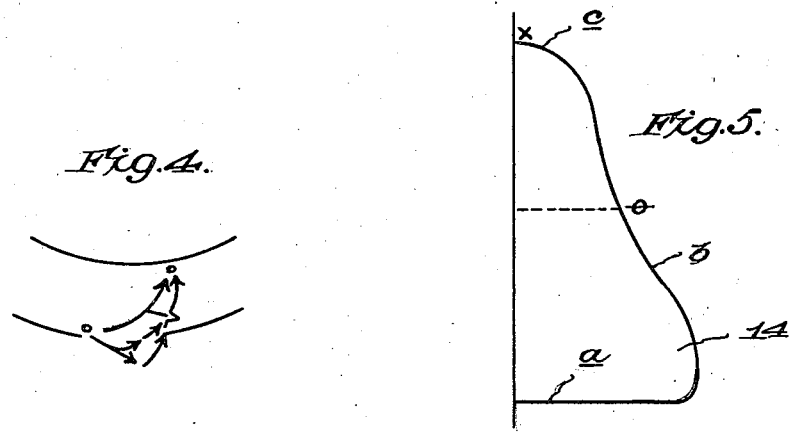
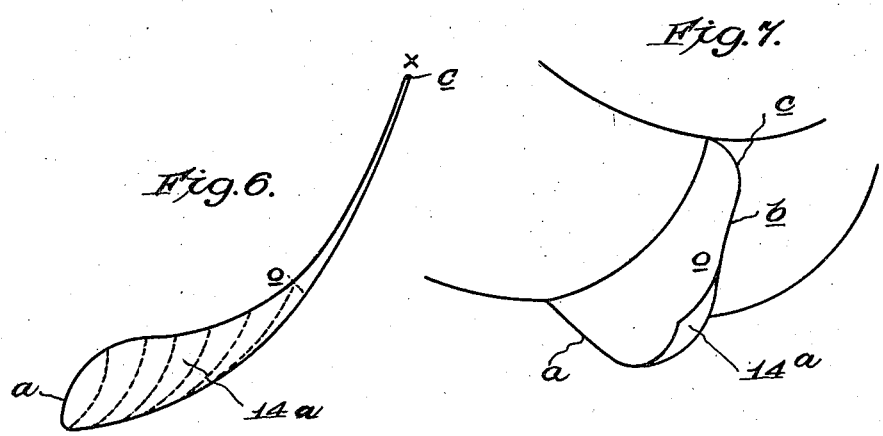
INVENTOR.
BERNARD D. BRANNER
BY
ATTORNEY Patented Nov. 5, 1946

2,410,625

UNITED STATES PATENT OFFICE 2,410,625

LANDING GEAR FOR AIRCRAFT

Bernard D. Branner, Waterford, Conn.

Application July 19, 1944, Serial No. 545,654

3 Claims. (Cl. 244—103)

The invention relates to landing gear for aircraft and more particularly to retractable landing gear for aircraft of the heavier-than-air type, commonly referred to as aeroplanes.

The object of the invention is to provide a novel landing gear whereby the initial landing shock on the entire landing gear is automatically lessened in an efficient and simple manner.

The invention contemplates further the provision of a novel landing gear whereby the impact friction factor developed by the initial contact of the landing wheels with the ground surface is automatically reduced to a harmless minimum.

A further object of the invention is the provision of a novel landing gear designed and constructed to conserve the rubber of the tire and to add materially to the life thereof.

Other objects will appear from the description hereinafter and the features of novelty will be pointed out in the claims.

In the accompanying drawings, which illustrate an example of the invention without defining its limits, Fig. 1 is a diagrammatic elevation of an aeroplane embodying the novel landing gear;

Fig. 4 is a diagrammatic view illustrating by means of directive arrows the dimensional planes utilized in the members included in the novel landing gear;

Fig. 5 is a diagrammatic front view of one of said members;

Fig. 6 is a side view showing the contour shape of a single member, and

Fig. 7 is a fragmentary perspective view of a single member as it appears on a landing wheel.

Figure 1:
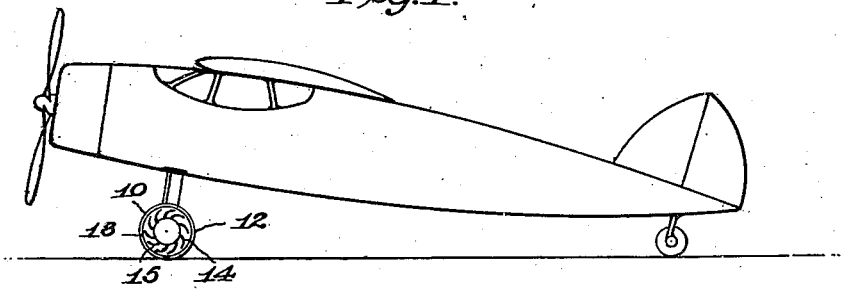

The running gear as such may be of any conventional type and may be embodied in the aeroplane in any well-known way with customary associated operating means for retracting and lowering the running gear in accordance with conventional practice.

In any event, as shown in the drawings, the landing gear includes the landing wheels 10 rotatably mounted on the frame 11 and provided with rubber or equivalent tires 12 preferably of the pneumatic type.

Each wheel 10 includes the customary rim 13 designed to receive and retain the tire 12, suitable provision being made for removing the tire 12 at will for purposes of replacement or for any other reason.

Figure 2:
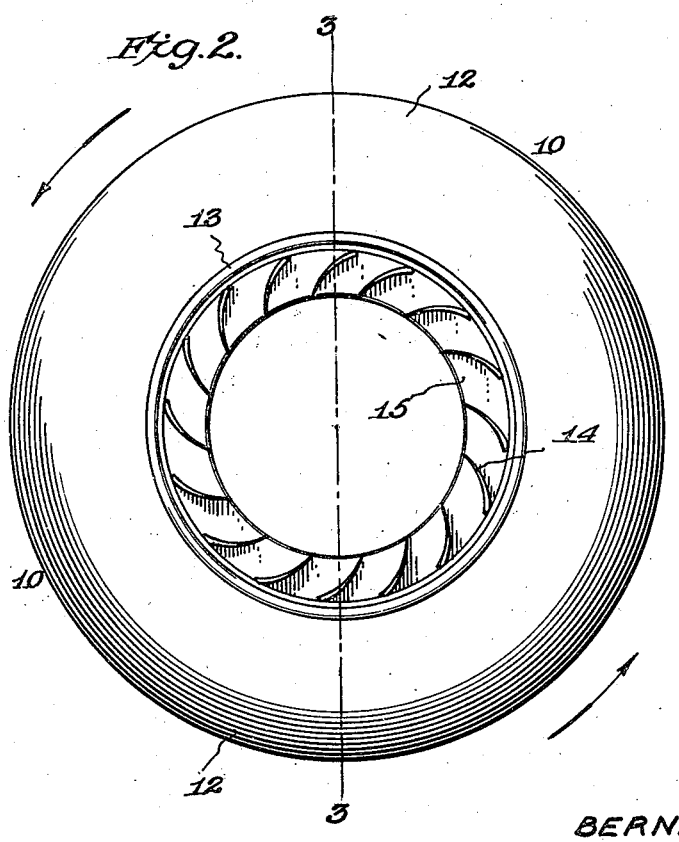
Fig. 2 is a side view of one of the landing wheels of said landing gear including the novel features.
Figure 3:
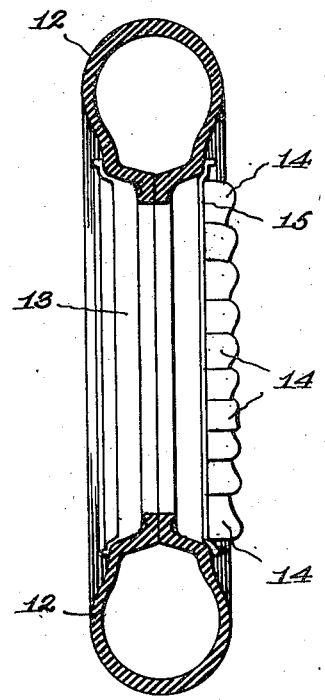
Fig. 3 is a sectional view of said wheel on the line 3—3 of Fig. 2.

Each wheel is provided with a plurality of vanes or cups 14 located at spaced intervals circumferentially of the rim 13 as illustrated in Fig. 1, and projecting outwardly therefrom so as to extend beyond the wheel as shown in Fig. 2.

The vanes or cups 14 may be cast or otherwise produced as independent elements and then conveniently fixed in place upon a supporting ring 15 which in turn may be suitably secured in place upon the rim 13.

In another form, the vanes or cups 14 and the supporting ring 15 may be cast or otherwise produced as integral parts of each other to constitute a one-piece unit. This procedure eliminates the necessity for the tapping which is required when the vanes 14 are produced as independent elements, and also reduces machining of the parts to a minimum. The aforesaid one-piece unit furthermore is of maximum lightness in weight and may be produced in a minimum of time.

In still another form, the rim 13, the vanes or cups 14 and the supporting ring 15 may all be cast together or otherwise produced as integral parts of a one-piece wheel unit. This procedure results in still further reducing the weight of the unit and eliminating entirely the need for any tapping thereof.

In any case, regardless of the process followed in producing the vanes 14 or the units including the same, said vanes or cups 14 are shaped and dimensioned to develop very little air resistance throughout one portion of their rotative path, and to serve as scoops for producing resistance to the air throughout the remaining portion of said rotative path, when the novel landing gear is down preparatory to a landing of the aeroplane.

In Fig. 4, the dimensional planes utilized in an individual vane or cup 14 are indicated by directive arrows.

When viewed from straight-ahead, as in Fig. 5, each vane or cup 14 presents an approximately tapering appearance with a relatively wide base $a$ and an undulating outer edge $b$ extending upwardly and inwardly and terminating in a curved relatively narrow upper end $c$ all as indicated in Fig. 5.

Each vane or cup 14 is curved in the general direction of the circumference of the wheel as shown in Fig. 6, the forward or lower end section being transversely curved throughout that portion extending from the base $a$ to an intermediate point, in the form of a scoop with an upturned outer section 14—$a$ when viewed as illustrated in Fig. 6. This scoop tapers inwardly toward the top (Fig. 5) and the outside flange or wall correspondingly diminishes, until at a point o about midway between the lower and upper ends of the vane said outside flange or wall completely merges or melts into the flush curvature thereof. From the point o to the upper end c the vane 14 is flush transversely and has curvature only in one dimension. The scoop form of the vane 14 is illustrated in perspective in Fig. 7 which shows also the curvature of the outside walls and its streamline merging or melting into the trailing part of the particular vane.

In practice, as the aeroplane approaches a landing, the landing gear is lowered in the customary manner at the conventional time, by the pilot, to adjust the landing wheels 10 to their lowered, landing position. In this position, as the aeroplane continues to advance, the pressure of the wind developed in the landing of the plane, on the vane or cups 14 located below the horizontal diameter of each wheel 10, will cause the latter to rotate in the direction of the arrows in Fig. 2. The wheels 10, therefore, rotatively engage the landing field, as the aeroplane reaches the same and immediately traverse the same in the direction of the continued forward landing movement of the plane until it is finally brought to rest. The initial engagement of the wheels 10 with the landing surface is accordingly a tangential moving contact instead of a scraping, sliding engagement as in the case when the landing wheels are stationary as the aforesaid initial engagement takes place.

As a result the novel landing gear serves to conserve rubber and adds greatly to the life of the tires 12 by reducing to a minimum, the initial contact friction which tends to burn off the rubber of said tires very quickly. At the same time by thus reducing the impact friction set up by said initial contact of the wheels 10 with the landing surface, the initial landing shock on the entire landing gear is materially reduced over that which is developed in the conventional type of landing gear in which the landing wheels are rotatively at rest when the initial landing contact takes place.

As the aeroplane comes in for a landing with the landing gear in its lowered position, the rotation of the landing wheels is affected automatically by the wind pressure developed in the landing of the plane. This wind pressure acts in one direction to rotate the landing wheels in such a way that the initial contact of said wheels with the landing surface will be a rotative engagement whereby the landing wheels are immediately caused to traverse said landing surface in the direction of landing of the particular plane in question. All of the vanes or cups are so designed that those vanes or cups located above the horizontal diameters of the wheels develop a streamline effect and accordingly exert very little resistance in opposition to the rotation of said wheels, while all the vanes or cups below said horizontal diameter act as scoops to produce resistance to the wind pressure and to thereby transmit rotary motion to the landing wheels.

The device is extremely simple in construction and principle of operation and relies entirely for power to rotatively operate the landing wheels, upon the resistance of the air, caused by the forward movement of the plane in its landing operation. The rotation of the landing wheels may be stopped at any desired point or time by applying the customary wheel brakes. In the landing of the plane, the aforesaid vanes or cups will also act as air brakes by increasing the drag on the plane.

The novel landing gear is designed with special regard to the heavy planes of today and to those of the future. As the size, weight and carrying capacity of aeroplanes is ever increasing in the aircraft industry and in the present planes, a device such as the one illustrated and described herein, will become a veritable necessity to avoid undue bulkiness in the landing gears and at the same time to enable the landing gears to absorb the tremendous impact shocks that they will be called upon to withstand.

In conjunction with the instant novel device a small, controllable speed governor may be attached, one to each individual wheel, with the speed for rotational motion of the wheels while in the air pre-set. Such speed governor would prevent the wheels from attaining too much momentum to cause "forward-lash friction" resulting from the push which in such case would develop with the initial contact of the landing wheels with the landing surface.

Although the present invention has been described in conjunction with a preferred embodiment it is to be understood that modifications and variations may be resorted to without departing from the spirit and scope of the invention as those skilled in the art will readily understand. Such variations and modifications are considered to be within the purview and scope of the claims.

I claim:

1. In a landing gear for aeroplanes including landing wheels, that improvement which comprises a plurality of vanes projecting outwardly from said wheels at spaced intervals circumferentially thereof, each vane being curved in the direction of its length and tapering longitudinally inwardly toward the associated wheel and having its forward end portion provided with an upturned outer edge section to constitute a scoop whereby said wheels are rotated on their axes by wind pressure developed in the landing of the plane to cause said wheels to rotatively engage the landing surface as said aeroplane reaches the same.

2. In a landing gear for aeroplanes including landing wheels, that improvement which comprises a plurality of vanes projecting outwardly from said wheels at spaced intervals circumferentially thereof, each vane being curved in the direction of its length and having its forward end portion shaped like a scoop with an upturned outer section gradually merging into the vane at an intermediate point whereby said wheels are rotated on their axes by wind pressure developed in the landing of the plane to cause said wheels to rotatively engage the landing surface as said aeroplane reaches the same.

3. In a landing gear for aeroplanes including landing wheels, that improvement which comprises a plurality of vanes projecting outwardly from said wheels at spaced intervals circumferentially thereof, each vane being curved in the direction of its length and tapering longitudinally inwardly toward the associated wheel and having its forward end portion shaped like a scoop with an upturned outer section gradually merging into the vane at an intermediate point whereby said wheels are rotated on their axes by wind pressure developed in the landing of the plane to cause said wheels to rotatively engage the landing surface as said aeroplane reaches the same.

BERNARD D. BRANNER.